(12) United States Patent
Yeon et al.

(10) Patent No.: US 9,590,496 B2
(45) Date of Patent: Mar. 7, 2017

(54) VOLTAGE REGULATOR AND POWER DELIVERING DEVICE THEREWITH

(71) Applicant: SAMSUNG ELECTRONICS CO., LTD., Suwon-si, Gyeonggi-do (KR)

(72) Inventors: Pyungwoo Yeon, Seoul (KR); Sungwoo Moon, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 190 days.

(21) Appl. No.: 14/566,113

(22) Filed: Dec. 10, 2014

(65) Prior Publication Data

US 2015/0171743 A1 Jun. 18, 2015

(30) Foreign Application Priority Data

Dec. 16, 2013 (KR) .......................... 10-2013-0156526

(51) Int. Cl.
*H02M 1/44* (2007.01)
*H02M 7/04* (2006.01)
(Continued)

(52) U.S. Cl.
CPC .............. *H02M 1/44* (2013.01); *G05F 1/575* (2013.01); *H02M 3/156* (2013.01); *H02M 7/04* (2013.01)

(58) Field of Classification Search
CPC .......... H02M 1/44; H02M 3/156; H02M 7/04; H02J 7/04
(Continued)

(56) References Cited

U.S. PATENT DOCUMENTS 2,625,675 A * 1/1953 Lupo ......................... G05F 1/52
318/479
2,866,151 A * 12/1958 Applin et al. ............ G05F 1/52
323/291
(Continued)

FOREIGN PATENT DOCUMENTS

EP 0862102 9/1998
JP 2005-295754 10/2005
(Continued)

OTHER PUBLICATIONS

Hoon et al., "A Low Noise, High Power Supply Rejection Low Dropout Regulator for Wireless System-on-Chip Applications", 2005, IEEE 2005 Custom Integrated Circuits Conference, Digest, pp. 759-762.*

(Continued)

*Primary Examiner* — Sun Lin
(74) *Attorney, Agent, or Firm* — F. Chau & Associates, LLC

(57) ABSTRACT

A voltage regulator includes a pass unit configured to transfer an input voltage to an output node as an output voltage according to a control signal, a voltage dividing unit configured to divide the output voltage to generate a divided output voltage, an error amplifying unit configured to output a comparison signal based on comparing a magnitude of the divided output voltage with a magnitude of a reference voltage, and a filter unit configured to filter noise included in the outputted comparison signal to generate the control signal. The filtered noise can correspond to noise included in the outputted comparison signal by transferring noise included in the input voltage to the error amplifying unit via the pass unit and the voltage dividing unit.

20 Claims, 11 Drawing Sheets

(51) Int. Cl.
*H02J 7/04* (2006.01)
*H02M 3/156* (2006.01)
*G05F 1/575* (2006.01)

(58) Field of Classification Search
USPC .............................................................. 320/107
See application file for complete search history.

(56) References Cited

U.S. PATENT DOCUMENTS

| | | | | |
|---|---|---|---|---|
| 3,979,658 | A * | 9/1976 | Foster | H02J 7/0081 |
| | | | | 320/156 |
| 4,331,978 | A * | 5/1982 | Nowaczyk | H04N 5/63 |
| | | | | 348/730 |
| 5,493,211 | A * | 2/1996 | Baker | G01R 33/07 |
| | | | | 324/117 H |
| 5,852,359 | A | 12/1998 | Callahan, Jr. et al. | |
| 5,889,393 | A | 3/1999 | Wrathall | |
| 5,945,818 | A | 8/1999 | Edwards | |
| 6,522,114 | B1 * | 2/2003 | Bakker | G05F 1/467 |
| | | | | 323/282 |
| 6,856,124 | B2 * | 2/2005 | Dearn et al. | G05F 1/575 |
| | | | | 323/273 |
| 7,656,139 | B2 | 2/2010 | van Ettinger | |
| 7,919,954 | B1 * | 4/2011 | Mannama | G05F 1/575 |
| | | | | 323/272 |
| 8,019,293 | B2 * | 9/2011 | Dagher et al. | H04W 52/52 |
| | | | | 455/127.1 |
| 8,022,681 | B2 * | 9/2011 | Gurcan | G05F 1/565 |
| | | | | 323/283 |
| 8,080,983 | B2 | 12/2011 | Lourens et al. | |
| 8,639,200 | B2 * | 1/2014 | Dagher et al. | H04W 52/52 |
| | | | | 455/127.1 |
| 8,648,580 | B2 | 2/2014 | Wong | |
| 8,912,780 | B2 * | 12/2014 | Kawai et al. | H02M 3/156 |
| | | | | 323/284 |
| 2009/0153112 | A1 | 6/2009 | Xia et al. | |
| 2011/0133710 | A1 | 6/2011 | Pancholi et al. | |
| 2012/0223688 | A1 | 9/2012 | Iriarte et al. | |
| 2013/0099764 | A1 | 4/2013 | Zhang et al. | |

FOREIGN PATENT DOCUMENTS

| | | |
|---|---|---|
| JP | 2008-236816 | 10/2008 |
| JP | 2010-086013 | 4/2010 |
| KR | 1020130032287 | 4/2013 |
| WO | 2006083490 | 8/2006 |

OTHER PUBLICATIONS

Leung et al., "A Low-Voltage CMOS Low-Dropout Regulator with Enhanced Loop Response", 2004, IEEE, ISCAS pp. 385-388.*
Morita, Glenn, "Noise Sources in Low Dropout (LDO) Regulators", Analog Devices AN-1120 Application Note, pp. 1-12, (2011).
El-Nozahi, et al., "High PSR Low Drop-Out Regulator With Feed-Forward Ripple Cancellation Technique", IEEE Journal of Solid-State Circuits, vol. 45, No. 3, Mar. 2010, pp. 565-577.
Supplementary European Search Report Dated Jan. 12, 2009 Corresponding to Application No. EP 06 71 7728.

* cited by examiner

VOLTAGE REGULATOR AND POWER DELIVERING DEVICE THEREWITH

CROSS-REFERENCE TO RELATED APPLICATIONS

This U.S. non-provisional patent application claims priority under 35 USC §119 to Korean Patent Application No. 10-2013-0156526, filed on Dec. 16, 2013, the disclosure of which is incorporated by reference in its entirety herein.

BACKGROUND

1. Technical Field

Embodiments of the present disclosure relate to voltage regulators and, more particularly, to a voltage regulator for filtering noise included in an input voltage and a power delivering device including the voltage regulator.

2. Discussion of Related Art

A voltage regulator is used to stably supply power to an electronic device. Voltage regulators are classified into linear regulators and switching regulators. A DC-DC converter is one type of switching regulator. The DC-DC converter has high converting efficiency. However, an output voltage of the DC-DC converter includes more noise than that of a linear regulator.

A low-dropout regulator (hereinafter referred to as "LDO regulator") is one type of linear regulator. The LDO regulator has low converting efficiency, but has a fast response speed. An output voltage of the LDO regulator includes less noise than that of a DC-DC converter. Further, the LDO regulator may be used to supply power to a noise-sensitive device or a device that needs to be driven with high performance.

A power supply rejection ratio (hereinafter referred to as "PSRR") is a ratio of output voltage noise to input voltage noise. The PSRR is used as an index to indicate the degree to which input voltage noise is effectively cut off in a specific frequency band by a voltage regulator to stably supply a voltage. When noise is included in an input voltage of the voltage regulator, an output voltage of the voltage regulator is not maintained at a constant value due to the noise. In particular, input voltage noise of a linear regulator is not effectively cut off in a high-frequency band between several hundreds of kilohertz (kHz) and several megahertz (MHz) that is greater than a gain crossover frequency of a closed circuit loop of a linear regulator. Therefore, it is difficult to generate a stable output voltage in a high-frequency band.

SUMMARY OF THE INVENTION

At least one embodiment of the present inventive concept provides a voltage regulator and a power delivering device including the same. In particular, a voltage regulator or a power delivering device according to at least one exemplary embodiment of the inventive concept may be flexibly designed according to an area of a chip or a board. Moreover, a frequency band, which is to be a filtering target according to an embodiment of the inventive concept, may be selected as necessary.

According to an exemplary embodiment of the inventive concept, a voltage regulator includes a pass unit, a voltage dividing unit, an error amplifying unit, and a filter unit. The pass unit is configured to transfer an input voltage provided from an input node to an output node as an output voltage according to a control signal. The voltage dividing unit is configured to divide the output voltage to generate a divided output voltage. The error amplifying unit is configured to output a comparison signal based on a result of comparing a magnitude of the divided output voltage with a magnitude of a reference voltage. The filter unit is configured to filter noise included in the outputted comparison signal to generate the control signal. The filtered noise may correspond to noise included in the outputted comparison signal by transferring noise included in the input voltage to the error amplifying unit via the pass unit and the voltage dividing unit.

In an exemplary embodiment, the pass unit includes an NMOS transistor, the control signal is provided to a gate terminal of the NMOS transistor, the input voltage is provided to one terminal of the NMOS transistor, and the output voltage is output from an other end of the NMOS transistor.

In an exemplary embodiment, the voltage dividing unit includes a first dividing resistor and a second dividing resistor connected in series, the output voltage is provided to one of one end of the first dividing resistor and one end of the second dividing resistor, and the divided output voltage is one of a voltage across the first dividing resistor and a voltage across the second dividing resistor.

In an exemplary embodiment, the error amplifying unit includes an operational amplifier having an inverting input terminal, a non-inverting input terminal, and an output terminal, the divided output voltage is provided to the inverting input terminal, the reference voltage is provided to the non-inverting input terminal, and the comparison signal is outputted from the output terminal.

In an exemplary embodiment, the filter unit includes one of a low pass filter circuit and a band rejection filter circuit.

In an exemplary embodiment, one of the low pass filter circuit and the band rejection filter circuit is an on-chip filter circuit disposed on a chip together with the pass unit, the voltage dividing unit, and the error amplifying unit.

In an exemplary embodiment, one of the low pass filter circuit and the band rejection filter circuit is disposed outside a chip including the pass unit, the voltage dividing unit, and the error amplifying unit.

In an exemplary embodiment, the filter unit includes a first resistor and a first capacitor each having one end connected to an output terminal of the error amplifying unit, a second resistor and a second capacitor coupled in series between an other end of the first resistor and an other end of the first capacitor, a third resistor having one end connected to the other end of the first resistor, a third capacitor coupled between the other end of the first capacitor and an other end of the third resistor, and a buffer for buffering a voltage at the other end of the third resistor to output the control signal.

In an exemplary embodiment, a cut-off band of the low pass filter circuit or a rejection band of the band rejection filter circuit does not overlap a loop gain band determined by the pass unit, the voltage dividing unit, and the error amplifying unit.

According to an exemplary embodiment of the inventive concept, a power delivering device includes the above-described voltage regulator, a charger, a buck converter, a high-voltage linear regulator, and a rectifying unit. The charger is configured to generate a charging current to be provided to a battery based on a charging voltage. The buck converter is configured to output the charging voltage based on a rectified voltage. The high-voltage linear regulator is configured to generate the input voltage, and an operation voltage for operating the buck converter based on the rectified voltage. The rectifying unit is configured to rectify an AC voltage provided from a transmitter to output the rectified voltage.

According to an exemplary embodiment of the inventive concept, a power delivering device includes a DC-DC converter, a pass unit, a voltage dividing unit, an error amplifying unit, and a filter unit. The DC-DC converter is configured to receive an input voltage, receive a switching signal for controlling a regulated voltage to be outputted based on the received input voltage, and output the regulated voltage according to the received switching signal. The pass unit is configured to transfer the outputted regulated voltage provided from an input node to an output node as an output voltage according to a control signal. The voltage dividing unit is configured to divide the output voltage to generate a divided output voltage. The error amplifying unit is configured to output a comparison signal based on a result of comparing the magnitude of the divided output voltage with a magnitude of a reference voltage. The filter unit is configured to filter noise included in the outputted comparison signal to generate the control signal. The filtered noise may correspond to noise included in the outputted comparison signal by transferring noise included in the outputted regulated voltage to the error amplifying unit via the pass unit and the voltage dividing unit.

In an exemplary embodiment, the pass unit includes a transistor, where the control signal is provided to a gate terminal of the transistor, the input voltage is provided to one terminal of the transistor, and the output voltage is outputted from an other terminal of the transistor.

In an exemplary embodiment, the voltage dividing unit includes a first dividing resistor and a second dividing resistor connected in series, where the output voltage is output from one of a first end of the first dividing resistor and a first end of the second dividing resistor, and the divided output voltage is one of a voltage across the first dividing resistor and a voltage across the second dividing resistor.

In an exemplary embodiment, the error amplifying unit includes an operational amplifier having an inverting input terminal, a non-inverting input terminal, and an output terminal, where the divided output voltage is provided to the inverting input terminal, the reference voltage is provided to the non-inverting input terminal, and the comparison signal is outputted from the output terminal.

In an exemplary embodiment, the filter unit includes one of a low pass filter circuit and a band pass rejection filter circuit.

In an exemplary embodiment, a cut-off band of the low pass filter circuit or a rejection band of the band rejection circuit does not overlap a loop gain band determined by the pass unit, the voltage dividing unit, and the error amplifying unit.

According to an exemplary embodiment of the inventive concept, a voltage regulator includes a switch, a voltage divider circuit, an amplifier circuit, and a filter circuit. The switch is configured to receive an input voltage and output an output voltage according to a control signal. The voltage divider circuit is configured to divide the output voltage to generate a divided output voltage. The amplifier circuit is configured to output a comparison signal based on a result of comparing the divided output voltage with a reference voltage. The filter circuit is configured to perform a filtering operation on the comparison signal to generate the control signal. A cut-off band or a rejection band of the filter circuit does not overlap gain band determined by the switch, the voltage divider circuit, and the amplifier circuit.

In an exemplary embodiment, the switch includes a transistor, the control signal is provided to a gate terminal of the transistor, the input voltage is provided to a first non-gate terminal of the transistor, and the output voltage is outputted from a second non-gate terminal of the transistor.

In an exemplary embodiment, the divided output voltage is provided from a node between a pair of resistors of the voltage divider to an input of the amplifier circuit.

In an exemplary embodiment, the amplifier circuit includes an operational amplifier.

In an exemplary embodiment, the filter circuit is an on-chip filter circuit disposed on an integrated circuit together with the switch, the voltage divider circuit, and the amplifier circuit, or the filter circuit is disposed outside a chip comprising the switch, the voltage divider circuit, and the amplifier circuit.

BRIEF DESCRIPTION OF THE DRAWINGS

The drawings illustrate exemplary embodiments of the disclosure and, together with the description, serve to explain exemplary embodiments of the inventive concept. In the drawings.

DETAILED DESCRIPTION

The present inventive concept will now be described more fully through the following exemplary embodiments related to the accompanying drawings. However, the inventive concept is not limited to the following exemplary embodiments and may be embodied in other forms.

Figure 1:
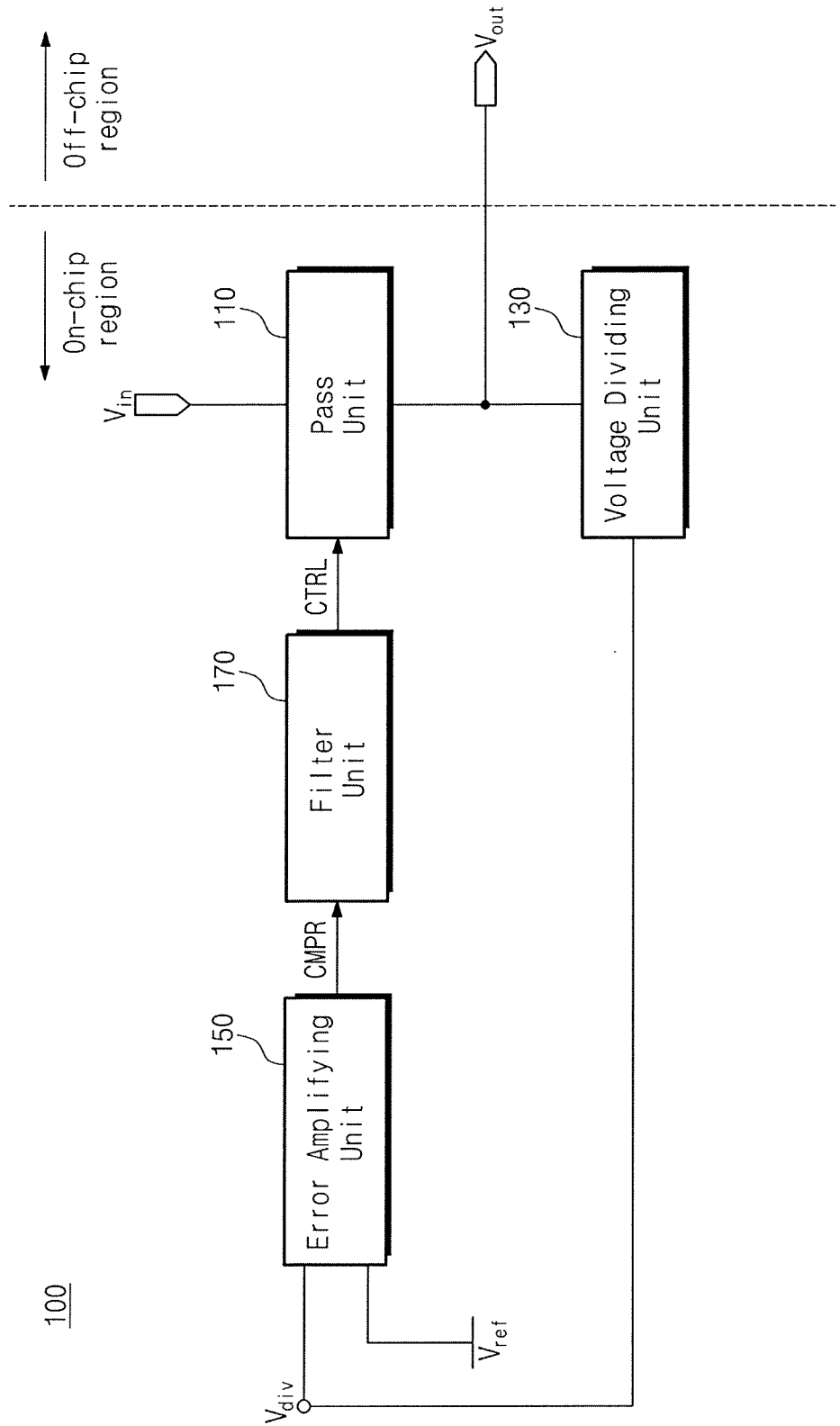
FIG. 1 is a block diagram illustrating a configuration of a voltage regulator according to an exemplary embodiment of the inventive concept.

FIG. 1 is a block diagram illustrating a voltage regulator 100 according to an exemplary embodiment of the inventive concept. As illustrated, the voltage regulator 100 includes a pass unit 110, a voltage dividing unit 130, an error amplifying unit 150, and a filter unit 170. In an exemplary embodiment of the inventive concept, the error amplifying unit 150 is a voltage amplifier.

The pass unit 110 receives an input voltage $V_{in}$. The input voltage $V_{in}$ may be received at an input node of the pass unit 110. For example, the input voltage $V_{in}$ may be directly provided to the pass unit 110 from an external power supply. Alternatively, the input voltage $V_{in}$ may be provided from another voltage regulator (e.g., a switching regulator or a linear regulator) or a power delivering device. The pass unit 110 receives a control signal CTRL. The control signal CTRL is a signal to control an output voltage $V_{out}$ to be outputted based on the input voltage $V_{in}$. The pass unit 110 outputs the output voltage $V_{out}$ according to the received control signal CTRL. The output voltage $V_{out}$ may be outputted at an output node.

The voltage dividing unit 130 may be connected to the output node at which the output voltage $V_{out}$ is outputted. The voltage dividing unit 130 divides the output voltage $V_{out}$. The voltage dividing unit 130 feeds back a divided voltage $V_{div}$ to the error amplifying unit 150. That is, the voltage dividing unit 130 divides the output voltage $V_{out}$ to generate the divided voltage $V_{div}$, and provides the divided voltage $V_{div}$ to the error amplifying unit 150 as an input.

The error amplifying unit 150 receives the divided voltage $V_{div}$. In addition, the error amplifying unit 150 receives a reference voltage $V_{ref}$. The error amplifying unit 150 outputs a comparison signal CMPR. The comparison signal CMPR is generated based on a result of comparing the magnitudes of the divided voltage $V_{div}$ and the reference voltage $V_{ref}$.

The filter unit 170 is optional. When there is no filter unit 170, the comparison signal CMPR is directly provided to the pass unit 110 as a control signal CTRL. For example, when the divided voltage $V_{div}$ is smaller than the reference voltage $V_{ref}$, the comparison signal CMPR controls the pass unit 110 to increase a value of the output voltage $V_{out}$. When the divided voltage $V_{div}$ is greater than the reference voltage $V_{ref}$, the comparison signal CMPR controls the pass unit 110 to decrease the value of the output voltage $V_{out}$. However, when noise is included in the input voltage Vin, the noise may be included in the comparison signal CMPR according to signal flow in a loop formed by the pass unit 110, the voltage dividing unit 130, and the error amplifying unit 150. In this case, the comparison signal CMPR may not properly control the pass unit 110. As a result, the pass unit 110 may output an unstable output voltage $V_{out}$. The filter unit 170 may be used to filter the noise included in the comparison signal CMPR. When the filter unit 170 is used, a stable output voltage $V_{out}$ may be outputted.

The filter unit 170 receives the comparison signal CMPR. The filter unit 170 may filter the noise included in the comparison signal CMPR to generate a control signal CTRL. The noise filtered by the filter unit 170 may correspond to noise that is included in the comparison signal CMPR by transferring the noise included in the input voltage $V_{in}$ to the error amplifying unit 150 through the pass unit 110 and the voltage dividing unit 130.

For example, the filter unit 170 may include a low pass filter circuit. An example of a low pass filter circuit is a filter that passes low-frequency signals and attenuates signals with frequencies higher than a particular frequency (e.g., referred to as a cutoff frequency). Alternatively, the filter unit 170 may include a band rejection filter circuit. An example of a band rejection filter circuit is a filter that passes most frequencies unaltered, but attenuates those in a specific range to very low levels. The noise included in the comparison signal CMPR may be filtered according to a cut-off characteristic of a filter circuit included in the filter unit 170. Thus, the intensity of noise of a frequency component corresponding to the cut-off characteristic of the filter circuit included in the filter unit 170 may be attenuated. The effects obtained by using the filter unit 170 will be described in detail later with reference to FIGS. 2 and 3.

In an exemplary embodiment of the inventive concept, the low pass filter circuit or the band rejection filter circuit included in the filter unit 170 is an on-chip filter circuit disposed on a chip (e.g., an integrated circuit) together with the pass unit 110, the voltage dividing unit 130, and the error amplifying unit 150. In this case, the output node for outputting the output voltage $V_{out}$ may be configured to be accessed from the outside of the chip.

Figure 2:
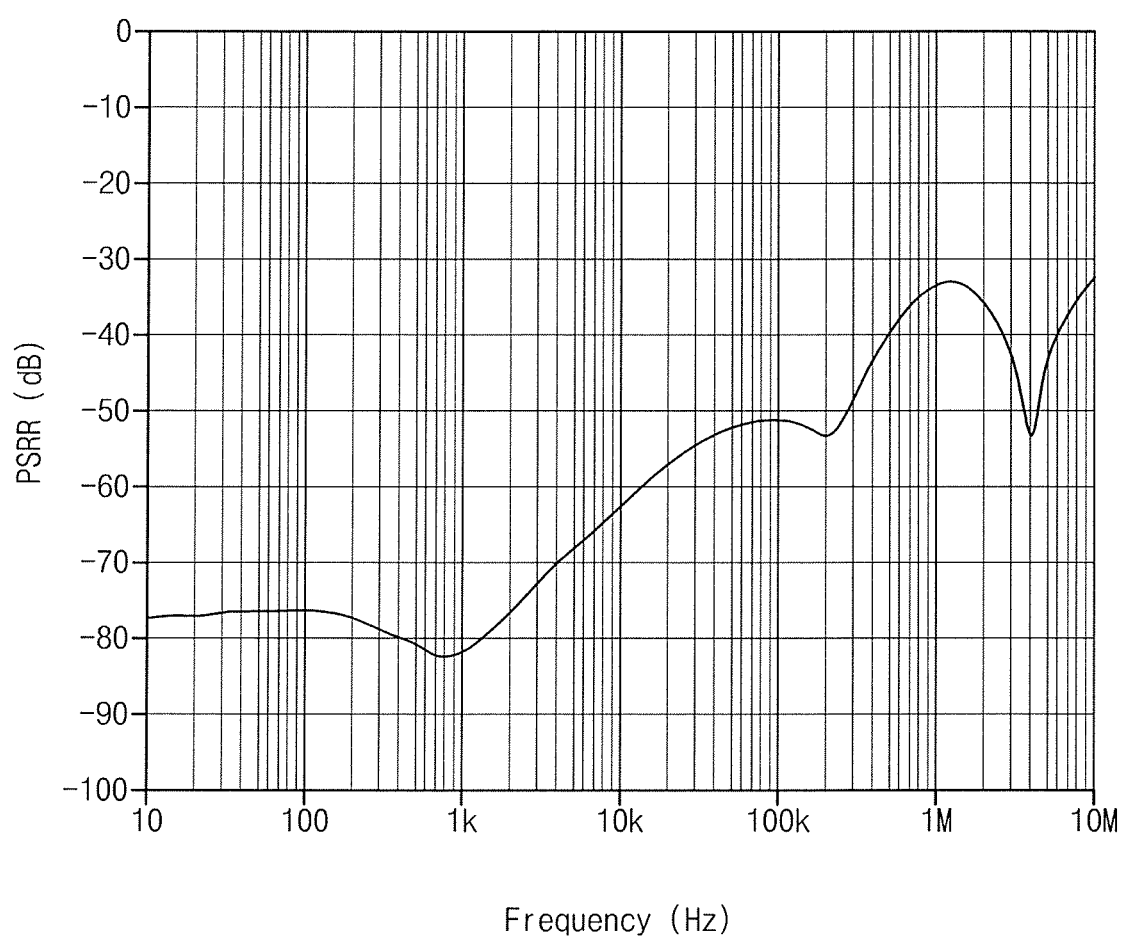
FIG. 2 is a graph for illustrating a PSRR characteristic of a typical voltage regulator.

FIG. 2 is a graph for illustrating a PSRR characteristic of a typical voltage regulator. In FIG. 2, the horizontal axis (Frequency (Hz)) represents a frequency component value of an input voltage applied to a voltage regulator, and the vertical axis (PSRR (dB)) represents a power supply rejection ratio (PSRR) of the voltage regulator. It is understood that the closer to zero a value of the PSRR is, the worse a PSRR characteristic of the voltage regulator is.

A PSRR characteristic of the voltage regulator with respect to a frequency band below 100 kHz of an input voltage is determined based on a loop gain characteristic of the voltage regulator. A PSRR characteristic of the voltage regulator with respect to a high-frequency band above 1 MHz of an input voltage is mainly determined by an external component of the voltage regulator. In particular, the PSRR characteristic of the voltage regulator with respect to the high-frequency band of the input voltage may be significantly affected by a parasitic inductance component of a load capacitor. Accordingly, the PSRR characteristic of the voltage regulator is more vulnerable to the high-frequency component of the input voltage. As can be seen from the graph in FIG. 2, the PSRR characteristic of the voltage regulator with respect to the high-frequency band above 1 MHz of the input voltage is worse than those of the voltage regulator with respect to the frequency band below 100 kHz of the input voltage.

Noise including a high-frequency component may be included in the input voltage of the voltage regulator. For example, when the voltage regulator directly receives a rectified AC voltage, the input voltage of the voltage regulator may include a ripple. Alternatively, when the input voltage of the voltage regulator is provided from a DC-DC converter, noise caused by switching of the DC-DC converter may be included in the input voltage of the voltage regulator. Furthermore, when an AC voltage is received from a wireless power transmitter using magnetic resonance, noise including a harmonic component of a resonant frequency may be included in the input voltage of the voltage regulator. The ripple, the noise caused by the switching, and the noise including a harmonic component of a resonant frequency may be noises of a high-frequency component.

Thus, the voltage regulator may output an unstable output voltage when at least one of the ripple, the noise caused by the switching, and the noise including a harmonic component of a resonant frequency is included in the input voltage of the voltage regulator. The filter unit 170 (see FIG. 1) is used to allow the voltage regulator to output a more stable voltage. In particular, the filter unit 170 may be used to filter noise including a frequency component corresponding to a frequency band in which a PSRR characteristic of the voltage regulator is below a certain level.

That is, the filter unit 170 may include a filter circuit for filtering noise of a high-frequency component such as ripple, noise caused by switching, and noise including a harmonic component of a resonant frequency. As previously set forth, the filter unit 170 may include a low pass filter circuit.

Alternatively, the filter unit 170 may include a band rejection filter circuit. The filter unit 170 may be configured to include a low pass filter circuit for filtering noise of a low-frequency component. However, the inventive concepts are not limited to the foregoing embodiments.

Figure 3:
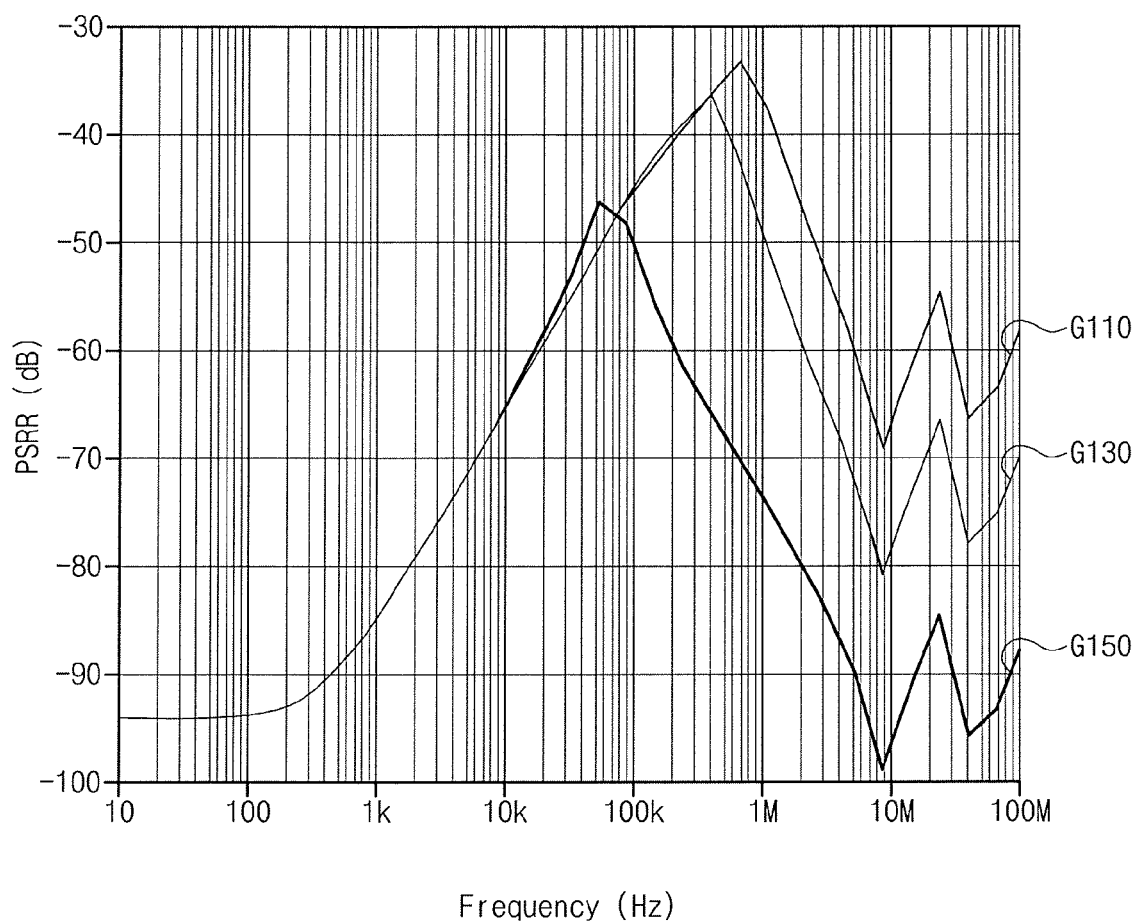
FIG. 3 is a graph for illustrating a PSRR characteristic of a voltage regulator according to an exemplary embodiment of the inventive concept.

FIG. 3 is a graph for illustrating a PSRR characteristic of a voltage regulator according to an exemplary embodiment of the inventive concept. That is, FIG. 3 is a graph for illustrating a PSRR characteristic of a voltage regulator including the filter unit 170 (see FIG. 1).

In the graph in FIG. 3, G110 denotes a PSRR characteristic of a voltage regulator that does not include the filter unit 170. As can be seen from the graph in FIG. 2, a PSRR characteristic of the voltage regulator with respect to a high-frequency band above 1 MHz of an input voltage is worse than those of the voltage regulator with respect to a frequency band below 100 kHz of the input voltage.

In the graph in FIG. 3, G130 denotes a PSRR characteristic of a voltage regulator including the filter unit 170 including a low pass filter circuit where a cut-off frequency is 530 kHz. Noise of a high-frequency component included in an input voltage of the voltage regulator is filtered based on a cut-off characteristic of the low pass filter circuit. As a result, a PSRR characteristic of the voltage regulator with respect to a high-frequency band of the input voltage is improved as compared to the G110.

In the graph in FIG. 3, G150 denotes a PSRR characteristic of the voltage regulator including the filter unit 170 including a low pass filter circuit where a cut-off frequency is 50 kHz. As compared to the G110 and the G130, a PSRR characteristic of the voltage regulator with respect to a high-frequency band of the input voltage is improved. According to the G130 and the G150, the PSRR characteristic of the voltage regulator with respect to a 1.6 MHz component of the input voltage is improved by about −24 dB to −12 dB. In addition, the PSRR characteristic of the voltage regulator with respect to a 13.56 MHz of the input voltage is improved by about −39 dB to −11 dB.

The lower a value of a cut-off frequency of a low pass filter is, the more improved a PSRR characteristic of a voltage regulator with respect to a high-frequency band of an input voltage is. However, if the cut-off frequency of the low pass filter is excessively low, a loop gain of the voltage regulator may be reduced. Thus, a cut-off frequency of the filter circuit included in the filter unit 170 needs to be set considering an influence on the loop gain of the voltage regulator.

For example, a cut-off band of a low pass filter circuit included in the filter unit 170 may be set not to overlap a loop gain band of the voltage regulator. According to this setting, a PSRR characteristic of the voltage regulator with respect to a high-frequency band of the input voltage may be improved while minimizing an influence on the loop gain of the voltage regulator. If the PSRR characteristic of the voltage regulator is improved, the voltage regulator may output a stable output voltage.

With reference to the graph in FIG. 3, there has been described a case where a filter circuit included in the filter unit 170 is a low pass filter circuit. However, the filter unit 170 may include a band rejection filter circuit for cutting off a component in a specific frequency band of the input voltage of the voltage regulator. Noise of a high-frequency component included in the input voltage of the voltage regulator may be filtered based on a cut-off characteristic of the band rejection filter circuit. Thus, a PSRR characteristic of the voltage regulator with respect to the high-frequency band of the input voltage may be improved. In this case, a rejection band of the band rejection filter circuit included in the filter unit 170 may be set not to overlap a loop gain band of the voltage regulator. However, the filter unit 170 may be configured to include a high pass filter circuit for filtering the noise of the low-frequency component. That is, the filter unit 170 may include a filter circuit having various configurations as necessary.

Figure 4:
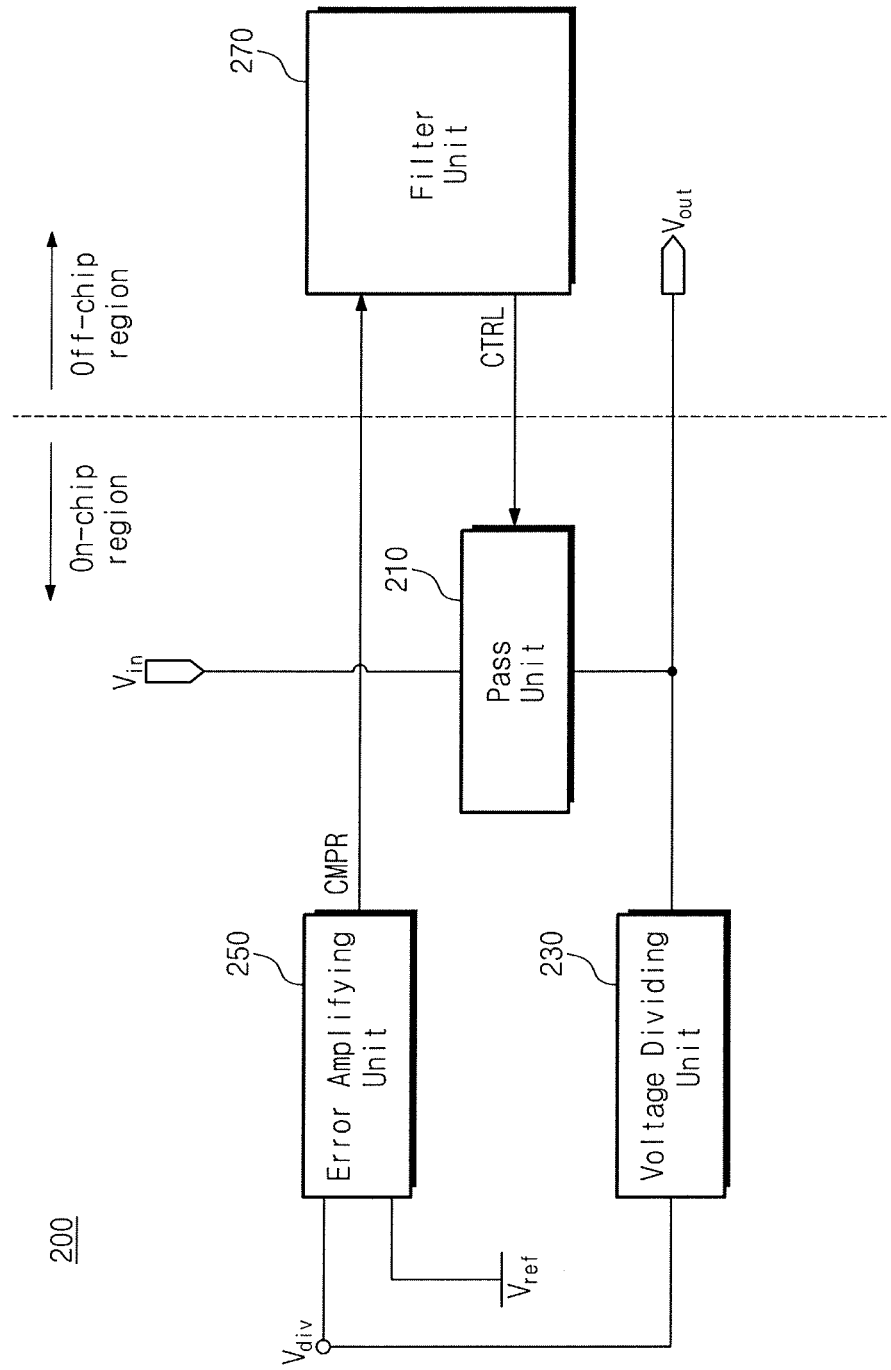
FIG. 4 is a block diagram illustrating a voltage regulator according to an exemplary embodiment of the inventive concept.

FIG. 4 is a block diagram illustrating a voltage regulator 200 according to an exemplary embodiment of the inventive concept. As illustrated, the voltage regulator 200 includes a pass unit 210, a voltage dividing unit 230, an error amplifying unit 250, and a filter unit 270. The configurations and the functions of the pass unit 210, the voltage dividing unit 230, the error amplifying unit 250, and the filter unit 270 may include those of the pass unit 110, the voltage dividing unit 130, the error amplifying unit 150, and the filter unit 170 in FIG. 1, respectively. Therefore, duplicated explanations of the configurations and the functions of pass unit 210, the voltage dividing unit 230, the error amplifying unit 250, and the filter unit 270 will be omitted.

In an exemplary embodiment, an output terminal of the error amplifying unit 250 and an input terminal of the pass unit 210 are configured to be accessed from the outside of a chip. A low pass filter circuit or a band rejection filter circuit included in the filter unit 270 may be disposed outside of a chip including the pass unit 210, the voltage dividing unit 230, and the error amplifying unit 250. In this case, the filter unit 270 may be configured independently outside of the chip by using a discrete element. The independently configured filter unit 270 may be connected to the output terminal of the error amplifying unit 250 and the input terminal of the pass unit 210.

According to this embodiment, a PSRR characteristic of the voltage regulator 200 with respect to a specific frequency band may be improved while keeping a characteristic of a loop formed by the pass unit 210, the voltage dividing unit 230, and the error amplifying unit 250. Furthermore, according to this embodiment, the voltage regulator 200 may be flexibly designed according to an area of a chip or a board.

Figure 5:
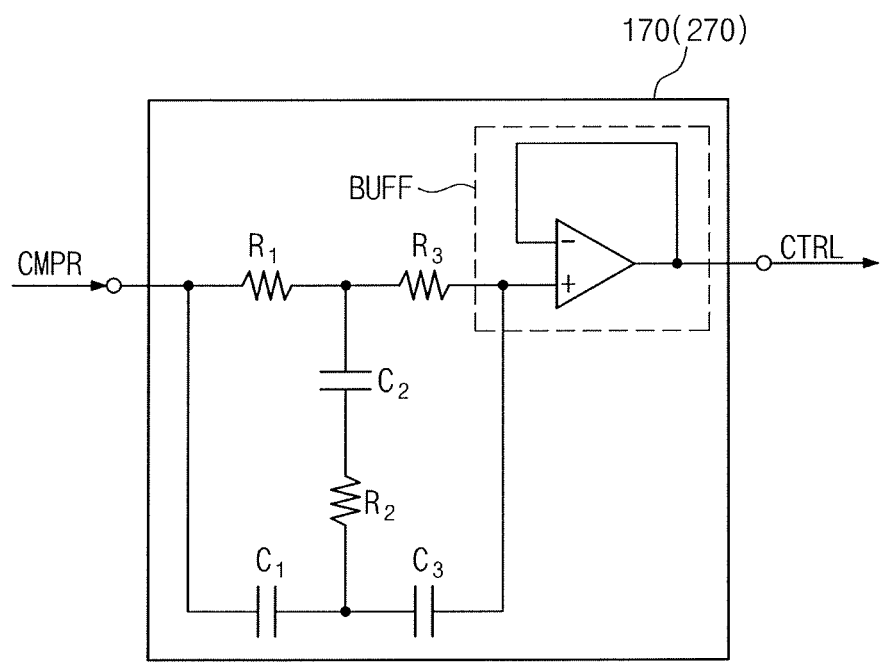
FIG. 5 is a conceptual diagram illustrating a filter unit according to an exemplary embodiment of the inventive concept.

FIG. 5 is a conceptual diagram illustrating the filter unit 170 (see FIG. 1) or 270 (see FIG. 4) according to an exemplary embodiment of the inventive concept. The filter unit 170 or 270 receives a comparison signal CMPR generated in the error amplifying unit 150 (see FIG. 1) or 250 (see FIG. 4). The filter unit 170 or 270 generates and provides a control signal CTRL to the pass unit 110 (see FIG. 10) or 210 (see FIG. 4). The control signal CTRL may be generated by removing noise included in the comparison signal CMPR based on a cut-off characteristic of a filter circuit included in the filter unit 170 or 270.

In an exemplary embodiment, the filter unit 170 or 270 may include a band rejection filter circuit. If the filter unit 170 or 270 includes a band rejection filter circuit, the band rejection filter circuit may include a first resistor $R_1$, a second resistor $R_2$, a third resistor $R_3$, a first capacitor $C_1$, a second capacitor $C_2$, a third capacitor $C_3$, and a buffer BUFF.

A first end of the first resistor $R_1$ is connected to an output terminal of the error amplifying unit 150 or 250. A first end of the first capacitor $C_1$ is connected to the output terminal of the error amplifying unit 150 or 250. The second resistor $R_2$ and the second capacitor $C_2$ are coupled in series between the second end of the first resistor $R_1$ and a second end of the first capacitor $C_1$. A first end of the third resistor $R_3$ is connected to a second end of the first resistor $R_1$. The third capacitor $C_3$ is coupled between the second end of the first capacitor $C_1$ and a second end of the third resistor $R_3$. The buffer BUFF is connected to the second end of the third resistor R₃. Thus, the buffer BUFF buffers and outputs a voltage of the second end of the third resistor R₃. A control signal CTRL corresponds to a voltage outputted by the buffer BUFF. In an exemplary embodiment, the buffer BUFF includes an operational amplifier.

In this embodiment, a rejection band of a band rejection filter circuit may be adjusted by adjusting each of component values of the first resistor $R_1$, the second resistor $R_2$, the third resistor $R_3$, the first capacitor $C_1$, the second capacitor $C_2$, and the third capacitor $C_3$. According to this embodiment, from among the noise included in the comparison signal CMPR, noise of a frequency component corresponding to the rejection band of the band rejection filter circuit may be filtered. Thus, a PSRR characteristic of the voltage regulator with respect to a frequency band corresponding to the rejection band of the band rejection filter circuit may be improved.

In an exemplary embodiment, one or more of the resistors R1-R3 is a variable resistor so their component values can be adjusted. In an exemplary embodiment, one or more of the capacitors C1-C3 is a variable capacitor so their component values can be adjusted.

In particular, the rejection band of the band rejection filter circuit may be set not to overlap a loop gain band of the voltage regulator. According to this setting, a PSRR characteristic of the voltage regulator with respect to a specific frequency band may be improved while minimizing an influence on the loop gain of the voltage regulator. If the PSRR characteristic of the voltage regulator is improved, the voltage regulator may output a stable output voltage.

However, the configuration of the filter unit 170 or 270 in FIG. 5 is merely one exemplary embodiment as the inventive concept is not limited thereto. For example, the filter unit 170 or 270 may include a filter circuit comprising only a passive element. Alternatively, the filter unit 170 or 270 may include another type of filter circuit or a filter circuit having another configuration. Accordingly, the inventive concept is not limited to the description made with reference to FIG. 5.

Figure 6:
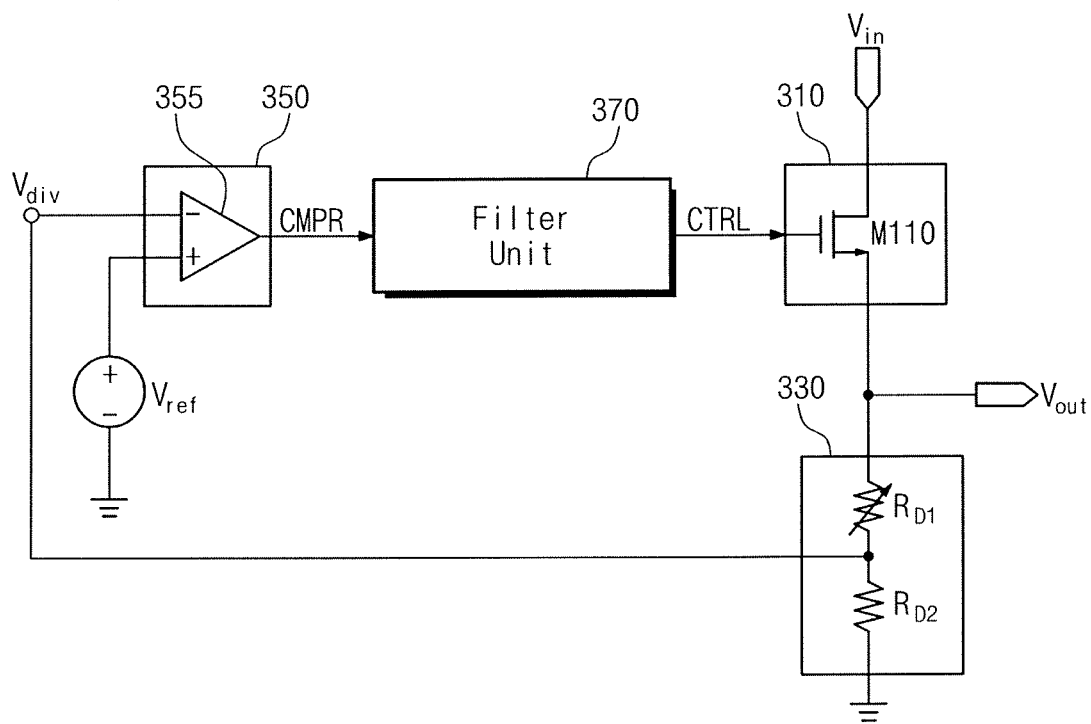
FIG. 6 is a block diagram illustrating a voltage regulator according to an exemplary embodiment of the inventive concept.

FIG. 6 is a block diagram illustrating a voltage regulator 300 according to an exemplary embodiment of the inventive concept. As illustrated, the voltage regulator 300 includes a pass unit 310, a voltage dividing unit 330, an error amplifying unit 350, and a filter unit 370. The configurations and the functions of the pass unit 310, the voltage dividing unit 330, the error amplifying unit 350, and the filter unit 370 may include those of the pass unit 110 or 210, the voltage dividing unit 130 or 230, the error amplifying unit 150 or 250, and the filter unit 170 or 270 in FIG. 1 or 4, respectively. Therefore, duplicated explanations of the configurations and the functions of pass unit 310, the voltage dividing unit 330, the error amplifying unit 350, and the filter unit 370 will be omitted.

In an exemplary embodiment, the pass unit 310 includes an NMOS transistor M110. In this embodiment, the NMOS transistor M110 includes a drain terminal, a source terminal, and a gate terminal. A control signal CTRL is provided to the gate terminal of the NMOS transistor M110. An input voltage $V_{in}$ is provided to one terminal of the NMOS transistor M110. An output voltage $V_{out}$ is outputted at the other terminal of the NMOS transistor M110. In an exemplary embodiment, the pass unit 310 is a switch or a different type of transistor such as a PMOS transistor, but will be described below with respect to an NMOS transistor.

In the above embodiment, the amount of current flowing from one terminal to the other terminal of the NMOS transistor M110 may be controlled according to the level of the control signal CTRL provided to the gate terminal of the NMOS transistor M110. The output voltage $V_{out}$ may be outputted based on the input voltage $V_{in}$ according to the control signal CTRL. In particular, when noise included in the comparison signal CMPR is filtered by the filter unit 370, the variation amount of a voltage difference between the gate terminal and the source terminal of the NMOS transistor M110 may be reduced. Thus, when the noise included in the comparison signal CMPR is filtered, the variation amount of drain current of the NMOS transistor M110 may be reduced. As a result, a PSRR characteristic of the voltage regulator 300 with respect to a frequency band corresponding to a rejection band of a filter circuit included in the filter unit 370 may be improved.

In an exemplary embodiment, the voltage dividing unit 330 includes a first dividing resistor $R_{D1}$ and a second dividing resistor $R_{D2}$. The first dividing resistor $R_{D1}$ and the second dividing resistor $R_{D2}$ are connected in series. In this embodiment, the output voltage $V_{out}$ is output from a terminal connected to one end of the first dividing resistor $R_{D1}$. However, the output voltage Vout may be output from a terminal connected to a first end of the second dividing resistor $R_{D2}$. In an exemplary embodiment, when the output voltage $V_{out}$ is provided to the first end of the first dividing resistor $R_{D1}$, a first end of the second dividing resistor $R_{D2}$ is grounded. In an exemplary embodiment, the first dividing resistor $R_{D1}$ is a variable resistor.

A divided voltage $V_{div}$ may be a voltage across the first dividing resistor $R_{D1}$. Alternatively, the divided voltage $V_{div}$ may be a voltage across the second dividing resistor $R_{D2}$. For example, the second end of the first dividing resistor $R_{D1}$ is connected to the second end of the second dividing resistor $R_{D2}$. In this embodiment, the divided voltage $V_{div}$ is outputted at a node where the second end of the first dividing resistor $R_{D1}$ and the second end of the second dividing resistor $R_{D2}$ are connected to each other.

In the above embodiment, the output voltage $V_{out}$ is divided and applied to each of the first dividing resistor $R_{D1}$ and the second dividing resistor $R_{D2}$. In particular, the magnitude of a voltage across the first dividing resistor $R_{D1}$ and the magnitude of a voltage across the second dividing resistor $R_{D2}$ are in proportion to a value of the first dividing resistor $R_{D1}$ and a value of the second dividing resistor $R_{D2}$. In this case, the magnitude of the divided voltage $V_{div}$ may be equal to that of the voltage across the second dividing resistor $R_{D2}$. That is, the divided voltage $V_{div}$ may have a value corresponding to a portion of a value of the output voltage $V_{out}$.

In an exemplary embodiment, the error amplifying unit 350 includes an operational amplifier 355. The operational amplifier 355 may include an inverting input terminal, a non-inverting input terminal, and an output terminal. In this embodiment, the divided voltage $V_{div}$ is provided to the inverting input terminal of the operational amplifier 355. A reference voltage $V_{ref}$ is provided to the non-inverting input terminal of the operational amplifier 355. The comparison signal CMPR is provided to the output terminal of the operational amplifier 355. The comparison signal CMPR may be used to determine whether the divided voltage $V_{div}$ is higher or lower than the reference voltage $V_{ref}$.

In the above embodiment, the operational amplifier 355 compares the level of a voltage applied to the inverting input terminal with the level of a voltage applied to the non-inverting input terminal, and outputs a signal corresponding to a result of the comparison. That is, the operational amplifier 355 generates a comparison signal CMPR based on a result of comparing the magnitudes of the divided voltage $V_{div}$ and a reference voltage $V_{ref}$.

As mentioned above, if noise is included in the input voltage $V_{in}$, the comparison signal CMPR may include the noise. When the comparison signal CMPR including the noise is directly provided to the gate terminal of the NMOS transistor M110, an unstable output voltage Vout may be outputted. The filter unit 370 is used to filter the noise included in the comparison signal CMPR.

Figure 7:
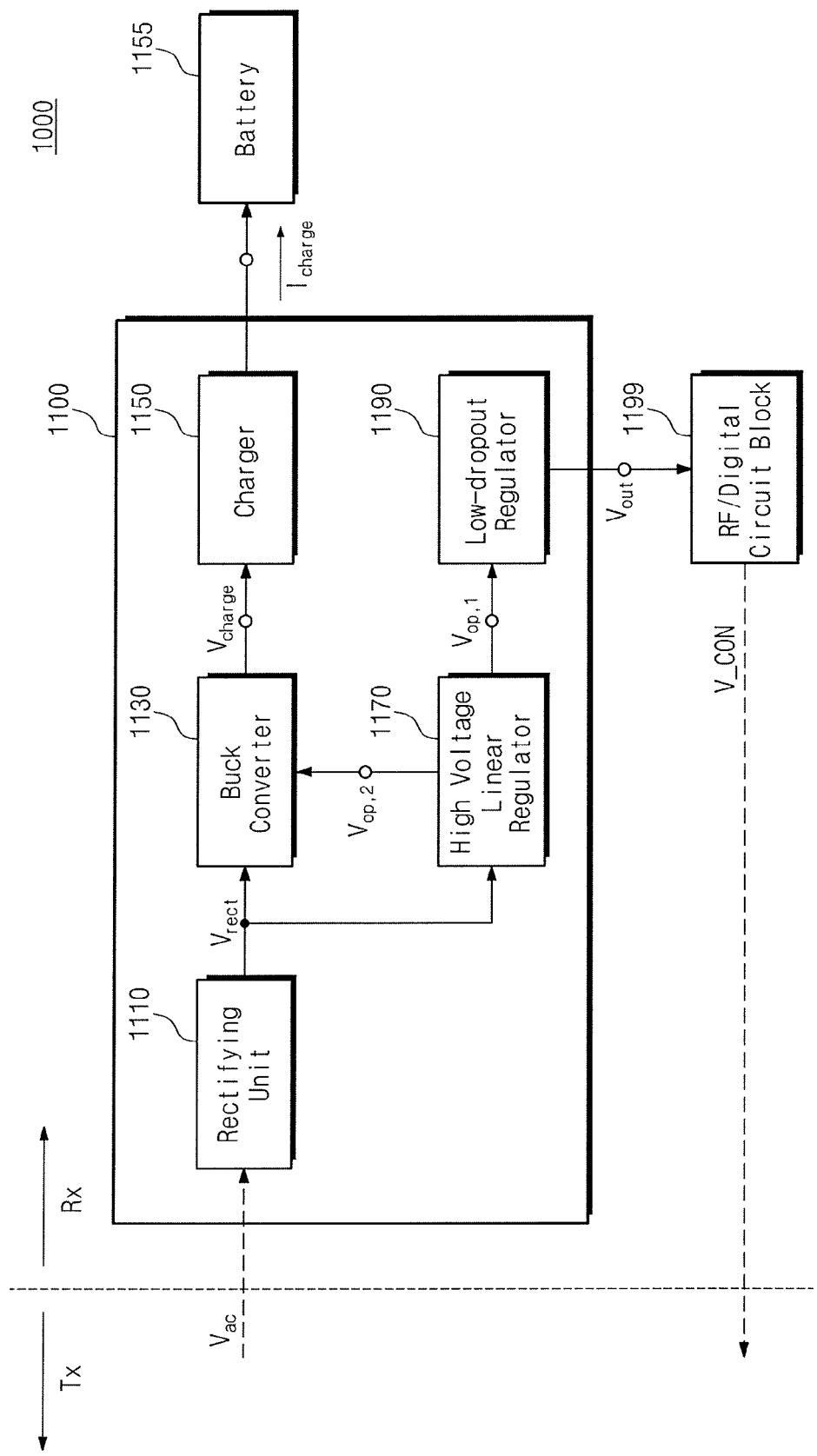
FIG. 7 is a block diagram illustrating a receiver of a power supply system including a power delivering device according to an exemplary embodiment of the inventive concept.

FIG. 7 is a block diagram illustrating a configuration of a receiver Rx of a power supply system including a power delivering device 1100 according to an exemplary embodiment of the inventive concept. As illustrated, the receiver Rx of the power supply system 1000 includes a power delivering device 1100, a battery 1155, and an RF/digital circuit block 1199. In an exemplary embodiment, the receiver Rx is an electronic device that receives radio waves of a radio frequency (RF) and converts the information carried by the waves into a usable form. The power delivering device 1100 includes a rectifying unit 1110, a buck converter 1130, a charger 1150, a high-voltage linear regulator 1170, and a low-dropout regulator (hereinafter referred to as "LDO regulator") 1190.

In the explanations below, it is assumed that the power supply system 1000 is a wireless charging system using magnetic resonance to help in understanding the inventive concept. However, the inventive concept is not limited thereto, as the power supply system 1000 may be another type or kind of system.

The rectifying unit 1110 may receive an AC voltage $V_{ac}$ from a transmitter Tx of the power supply system 1000. In an exemplary embodiment, the transmitter Tx is an electronic device, which with the aid of an antenna, produces radio waves. In an exemplary embodiment, the rectifying unit 1110 rectifies the received AC voltage $V_{ac}$ to generate a rectified voltage $V_{rect}$ and outputs the rectified voltage $V_{rect}$. The rectified voltage $V_{rect}$ may be a direct current (DC) voltage.

The buck converter 1130 receives the rectified voltage $V_{rect}$. The buck converter 1130 outputs a charging voltage $V_{charge}$ based on the rectified voltage $V_{rect}$. The buck converter 1130 may operate with a second operation voltage $V_{op,2}$ generated by the high-voltage linear regulator 1170.

The buck converter 1130 is one type of a DC-DC converter. The buck converter 1130 may convert the rectified voltage $V_{rect}$ having a greatly fluctuating value into the charging voltage $V_{charge}$ having a relatively stable value. For example, the rectified voltage $V_{rect}$ having a value fluctuating between 5V and 20V may be converted into the charging voltage $V_{charge}$ having a value around 5V via the buck converter 1130.

The charger 1150 generates charging current $I_{charge}$ based on the charging voltage $V_{charge}$. The charging current $I_{charge}$ is provided to a battery 1155. The amount of electric charges charged in the battery 1155 may increase due to the charging current $I_{charge}$.

The high-voltage linear regulator 1170 is applied with the rectified voltage $V_{rect}$. The high-voltage linear regulator 1170 generates a first operation voltage $V_{op,1}$ for operating the LDO regulator 1190, based on the rectified voltage $V_{rect}$. The high-voltage linear regulator 1170 generates the second operation voltage $V_{op,2}$ for operating the buck converter 1130, based on the rectified voltage $V_{rect}$.

The power delivering device 1100 does not receive power from the battery 1155. For this reason, a power supply is additionally required to operate the power delivering device 1100. The high-voltage linear regulator 1170 may serve as a power supply to operate the power delivering device 1100. In particular, the high-voltage linear regulator 1170 may convert a rectified voltage $V_{rect}$ having a greatly fluctuating value into first and second operation voltages $V_{op,1}$ and $V_{op,2}$ each having a relatively stable value. For example, a rectified voltage $V_{rect}$ having a value fluctuating between 5V and 20V may be converted into first and second operation voltages $V_{op,1}$ and $V_{op,2}$ each having a value around 5V via the high-voltage linear regulator 1170. If the power supply system 1000 is a wireless charging system using magnetic resonance, the first and second operation voltages $V_{op,1}$ and $V_{op,2}$ may include noise including a harmonic component of a resonant frequency.

The LDO regulator 1190 operates on the first operation voltage $V_{op}$ generated by the high-voltage linear regulator 1170. The LDO regulator 1190 outputs an output voltage $V_{out}$ based on the first operation voltage $V_{op,1}$. The output voltage $V_{out}$ outputted from the LDO regulator 1190 is applied to the RF/digital circuit block 1199. The RF/digital circuit block 1199 operates on the output voltage $V_{out}$. The RF/digital circuit block 1199 transmits a voltage control signal V_CON to the transmitter Tx of the power supply system 1000. The voltage control signal V_CON will be explained later with reference to FIG. 9.

When the LDO regulator 1190 is not used, the first operation voltage $V_{op,1}$ including the noise is directly applied to the RF/digital circuit block 1199. The RF/digital circuit block 1199 is sensitive to noise, and the noise may degrade communication performance of the RF/digital circuit block 1199. Therefore, the communication performance of the RF/digital circuit block 1199 may be degraded when the first operation voltage $V_{op,1}$ is directly applied to the RF/digital circuit block 1199.

A filter circuit including a choke inductor may be used to attenuate the intensity of the noise included in the first operation voltage $V_{op,1}$. However, the large volume of the choke inductor makes it difficult to use the filter circuit including the choke inductor in a small-sized electronic device. The LDO regulator 1190 according to an exemplary embodiment of the inventive concept is used instead of the filter circuit including the choke inductor. The use of the LDO regulator 1190 may allow the power delivering device 1100 to be decreased in size.

The LDO regulator 1190 may filter the noise included in the first operation voltage $V_{op,1}$ to output the output voltage $V_{op,1}$. Thus, the RF/digital circuit block 1199 may operate without degradation of communication performance. The configuration of the LDO regulator 1190 will be described below in detail with reference to FIG. 8.

Figure 8:
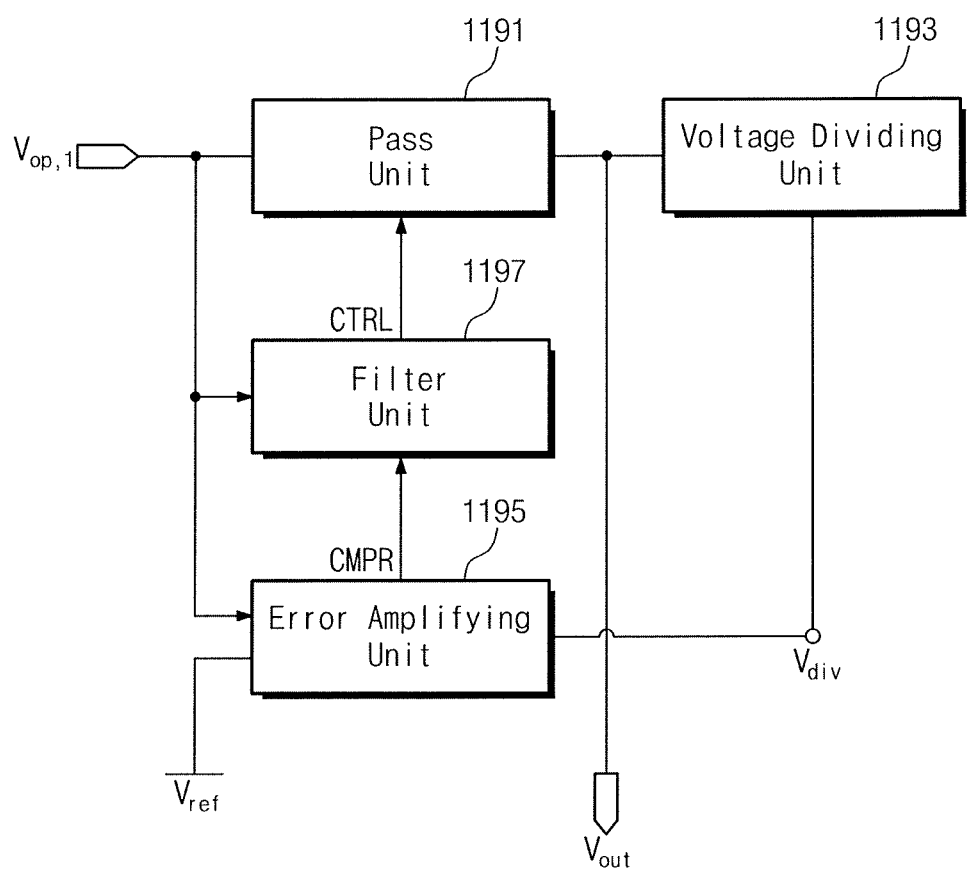
FIG. 8 is a block diagram illustrating a low-dropout (LDO) regulator according to an exemplary embodiment of the inventive concept.

FIG. 8 is a block diagram illustrating the LDO regulator 1190 according to an exemplary embodiment of the inventive concept. As illustrated, the LDO regulator 1190 includes a pass unit 1191, a voltage dividing unit 1193, an error amplifying unit 1195, and a filter unit 1197.

The pass unit 1191 receives a first operation voltage $V_{op,1}$, and the pass unit 1191 receives a control signal CTRL. The control signal CTRL controls an output voltage $V_{out}$ to be outputted based on the first operation voltage $V_{op,1}$. The pass unit 1191 may output the output voltage $V_{out}$ according to the received control signal CTRL.

The voltage dividing unit 1193 is connected to a node where the output voltage $V_{out}$ is outputted. The voltage dividing unit 1193 divides the output voltage $V_{out}$ to generate the divided voltage $V_{div}$. The voltage dividing unit 1193 feeds the divided voltage $V_{div}$ back to the error amplifying unit 1195. That is, the voltage dividing unit 1193 divides the output voltage $V_{out}$ to feedback the output voltage $V_{out}$. The divided voltage $V_{div}$ may have a value corresponding to a portion of a value of the output voltage $V_{out}$.

The error amplifying unit 1195 is applied with the divided voltage $V_{div}$ and a reference voltage $V_{ref}$. The error amplifying unit 1195 outputs a comparison signal CMPR. The comparison signal CMPR may be generated based on a result of comparing the magnitudes of the divided voltage $V_{div}$ and the reference voltage $V_{ref}$. For example, the error amplifying unit 1195 may operate with the first operation voltage $V_{op,1}$.

The filter unit 1197 receives the comparison signal CMPR. If noise is included in the first operation voltage $V_{op,1}$, the noise may be included in the comparison signal CMPR according to a signal flow in a loop formed by the pass unit 1191, the voltage dividing unit 1193, and the error amplifying unit 1195. The filter unit 1197 may filter the noise included in the comparison signal CMPR to generate the control signal CTRL. Thus, a stable output voltage $V_{out}$ may be outputted. The effects obtained by using the filter unit 1197 have been described previously with reference to FIGS. 1 to 3. For example, the filter unit 1197 may operate with the first operation voltage $V_{op,1}$.

For example, the filter unit 1197 may include a low pass filter circuit. Alternatively, the filter unit 1197 may include a band rejection filter circuit. The noise included in the comparison signal CMPR may be filtered according to a cut-off characteristic of the filter circuit included in the filter unit 1197. Thus, the intensity of noise of a frequency component corresponding to a cut-off characteristic of the filter circuit included in the filter unit 1197 may be attenuated.

In an exemplary embodiment, the low pass filter circuit or the band rejection filter circuit included in the filter unit 1197 is an on-chip filter circuit disposed on a chip together with the pass unit 1191, the voltage dividing unit 1193, and the error amplifying unit 1195. In an exemplary embodiment, the low pass filter circuit or the band rejection filter circuit included in the filter unit 1197 is disposed outside a chip including the pass unit 1191, the voltage dividing unit 1193, and the error amplifying unit 1195. The concept and effects of this embodiment have been described previously with reference to FIG. 4.

In an exemplary embodiment, a cut-off band of the low pass filter included in the filter unit 1197 or a rejection band of the band rejection filter included in the filter unit 1197 are set not to overlap a loop gain band of the LDO regulator 1190. According to this setting, a PSRR characteristic of the voltage regulator 1190 with respect to a specific frequency band of the first operation voltage $V_{op,1}$ may be improved while minimizing an influence on the loop gain of the voltage regulator 1190. The concept and effects of this embodiment have been described previously with reference to FIG. 3.

According to this embodiment, a power delivering device 1100 (see FIG. 7) may include a LDO regulator 1190 having a small size instead of a filter circuit including a choke inductor. If the use of the filter unit 1197 allows the PSRR characteristic of the LDO regulator 1190 to be improved, the LDO regulator 1190 may output a stable output voltage $V_{out}$. The output voltage $V_{out}$ may be applied to an RF/digital circuit block 1199 (see FIG. 7). If the stable output voltage $V_{out}$ is applied to the RF/digital circuit block 1199, the RF/digital circuit block 119 may operate without degradation of communication performance.

Figure 9:
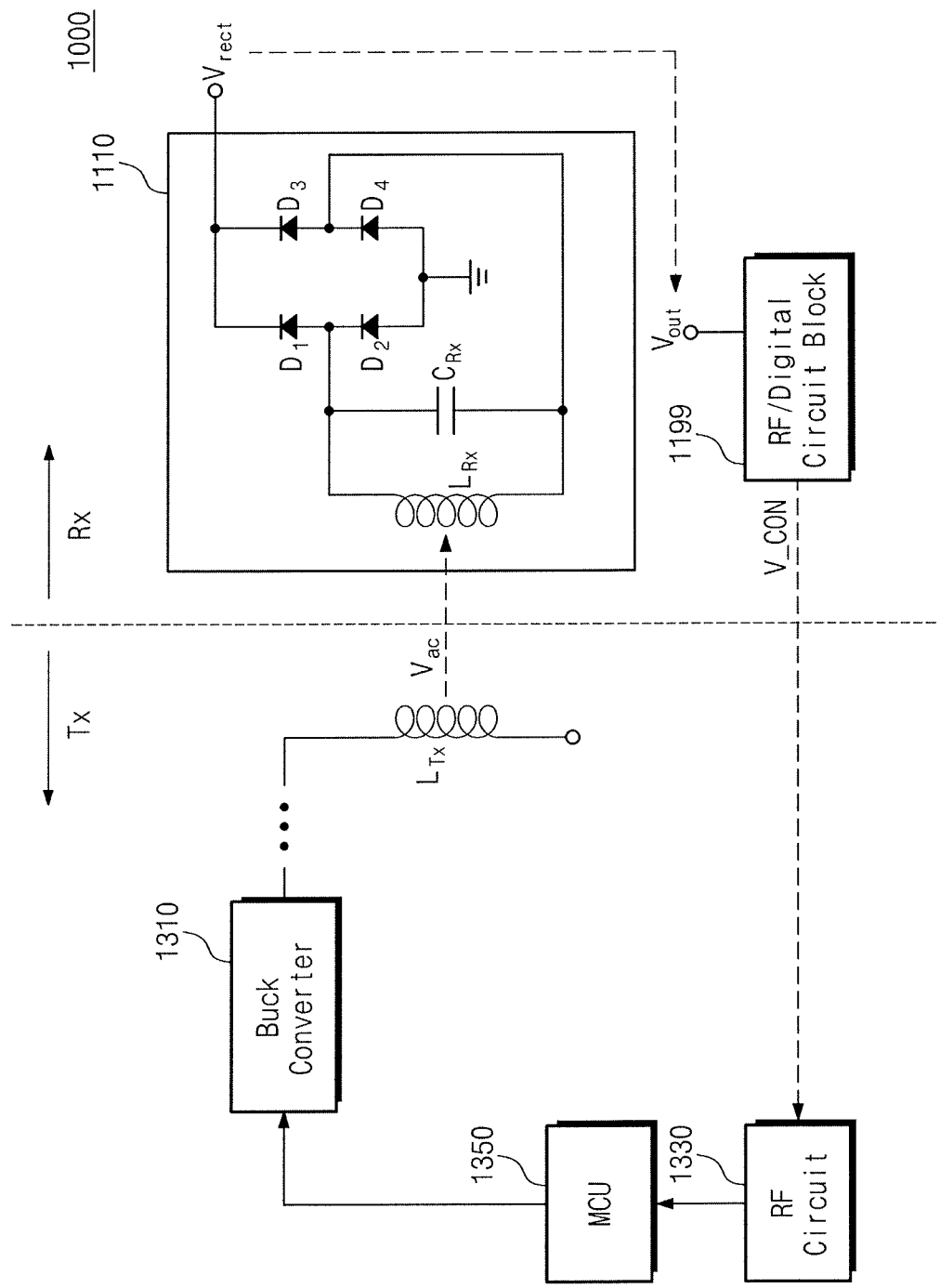
FIG. 9 is a block diagram illustrating a transmitter and a receiver of a power supply system according to an exemplary embodiment of the inventive concept.

FIG. 9 is a block diagram illustrating a transmitter and a receiver of a power supply system 1000 according to an exemplary embodiment of the inventive concept. Similar to the embodiment in FIG. 7, it is assumed that the power supply system 1000 in FIG. 9 is a wireless charging system using magnetic resonance. A transmitter Tx of the power supply system 1000 includes a buck converter 1310, a radio-frequency (RF) circuit 1330, a micro control unit (MCU) 1350, and a transmission inductor $L_{Tx}$. In an exemplary embodiment, the MCU 1350 is a microcontroller or a small computer on a single integrated circuit containing a processor core, a memory, a programmable input/output peripherals. Only a rectifying unit 1110 and an RF/digital circuit block 1199 are shown at a receiver Rx of the power supply system 1000. However, the configuration shown in FIG. 9 is merely exemplary for the convenience of description. That is, each of the transmitter Tx and the receiver Rx of the power supply system 1000 may further include components other than the components shown in FIG. 9.

The buck converter 1310 of the transmitter Tx delivers power to the transmission inductor $L_{Tx}$. A receiving inductor $L_{Rx}$ and a receiving capacitor $C_{Rx}$ included in the rectifying unit 1110 receive an AC voltage $V_{ac}$ from the transmission inductor $L_{Tx}$. The received AC voltage $V_{ac}$ may be rectified via a rectifying circuit including diodes $D_1$, $D_2$, $D_3$, and $D_4$ (i.e., $V_{ac}$ may be converted into a rectified voltage $V_{rect}$). As previously mentioned in FIG. 7, the rectified voltage $V_{rect}$ may be converted into an output voltage $V_{out}$ via a high-voltage linear regulator 1170 (see FIG. 7) and an LDO regulator 1190 (see FIG. 7).

The RF/digital circuit block 1199 may operate with the output voltage $V_{out}$. The RF/digital circuit block 1199 may transmit a voltage control signal V_CON to the RF circuit 1330 of the transmitter $T_x$. The voltage control signal V_CON is a signal to control the magnitude of the AC voltage $V_{ac}$ provided to the rectifying unit 1110. By controlling the magnitude of the AC voltage $V_{ac}$, the magnitude of a voltage applied to a component included in the transmitter $T_x$ of the power supply system 1000 may be adjusted. In particular, an LDO regulator 1190 (see FIG. 7) according to an exemplary embodiment of the inventive concept may output the output voltage $V_{out}$ to prevent degradation of communication performance of the RF/digital circuit block 1199.

The voltage control signal V_CON may be provided to the MCU 1350 via the RF circuit 1330. The MCU 1350 may control the buck converter 1310 based on the voltage control signal V_CON. The buck converter 1310 may adjust the magnitude of power delivered to the transmission inductor $L_{Tx}$ according to the control of the MCU 1350. Thus, the magnitude of the AC voltage $V_{ac}$ provided to the rectifying unit 1110 may be adjusted.

Figure 10:
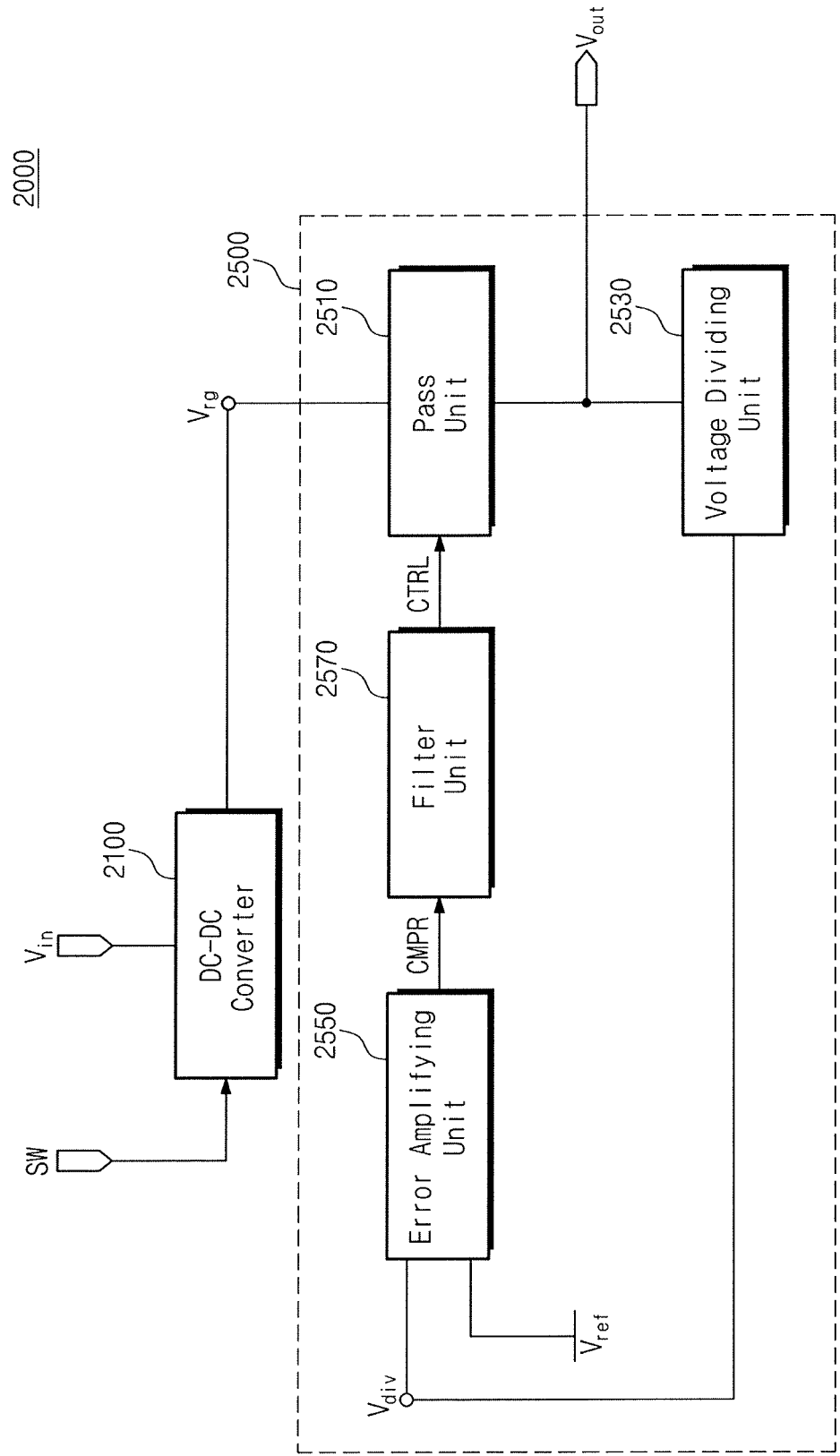
FIG. 10 is a block diagram illustrating a power delivering device according to an exemplary embodiment of the inventive concept.

FIG. 10 is a block diagram illustrating a power delivering device 2000 according to an exemplary embodiment of the inventive concept. As illustrated, the power delivering device 2000 includes a DC-DC converter 2100 and an LDO regulator 2500. In particular, the LDO regulator 2500 includes a pass unit 2510, a voltage dividing unit 2530, an error amplifying unit 2550, and a filter unit 2570.

The DC-DC converter 2100 receives an input voltage $V_{in}$, and a switching signal SW. The switching signal SW controls a regulation voltage $V_{rg}$ to be outputted based on the input voltage $V_{in}$. The DC-DC converter 2100 may output the regulation voltage $V_{rg}$ according to the switching signal SW. The DC-DC converter 2100 may convert an input voltage $V_{in}$ having a greatly fluctuating value into a regulation voltage $V_{rg}$ having a relatively stable value. Since the DC-DC converter 2100 operates depending on the switching signal SW, the regulation voltage $V_{rg}$ may include noise caused by switching.

The LDO regulator 2500 may serve as a sub-regulator for the DC-DC converter 2100. The LDO regulator 2500 may be used to filter noise included in the regulation voltage $V_{rg}$ and output a stable output voltage $V_{out}$. In particular, when power is supplied to a noise-sensitive device or a device that needs to be driven with high performance, a power delivering device 2000 in which the DC-DC converter 2100 and the LDO regulator 2500 are connected to each other may be used.

The configurations and functions of the pass unit 2510, the voltage dividing unit 2530, the error amplifying unit 2550, and the filter unit 2570 may include those of the pass unit 110 or 210, the voltage dividing unit 130 or 230, the error amplifying unit 150 or 250, and the filter unit 170 or 270 in FIG. 1 or 4, respectively. Therefore, the configurations and functions of the pass unit 2510, the voltage dividing unit 2530, the error amplifying unit 2550, and the filter unit 2570 will not be described in further detail.

Figure 11:
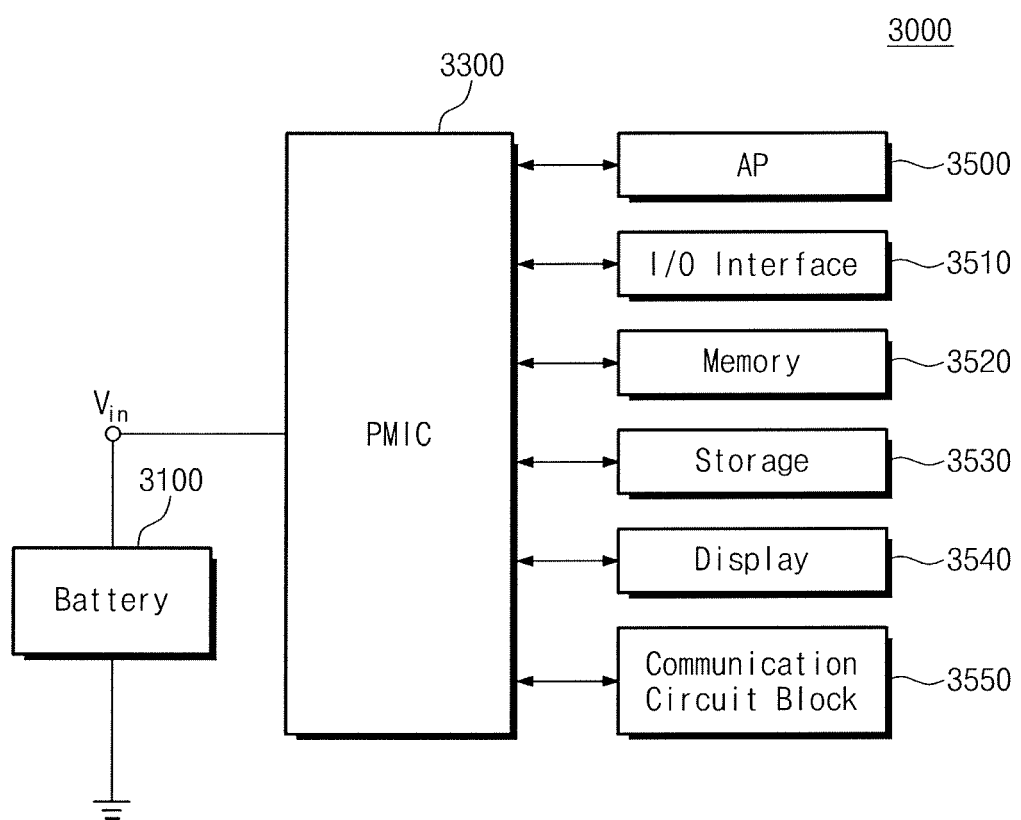
FIG. 11 is a block diagram illustrating a portable electronic device including a power delivering device according to an exemplary embodiment of the inventive concept.

FIG. 11 is a block diagram illustrating a portable electronic device 3000 including a power delivering device according to an exemplary embodiment of the inventive concept. As illustrated, the portable electronic device 3000 includes a battery 3100, a power management integrated circuit (PMIC) 3300, an application processor (AP) 3500, an input/output (I/O) interface 3510, a memory 3520, a storage 3530, a display 3540, and a communication circuit block 3550. However, the configuration of the portable electronic device 3000 shown in FIG. 11 is merely exemplary. The portable electronic device 3000 may further include components other than the components shown in FIG. 11. Alternatively, the portable electronic device 3000 may exclude at least one of the components shown in FIG. 11.

The battery 3100 outputs an input voltage $V_{in}$. The input voltage $V_{in}$ may be applied to the PMIC 3300. In an exemplary embodiment, the PMIC 3300 may include a power delivering device 2000 (see FIG. 10). That is, the PMIC 3300 may convert the input voltage $V_{in}$ applied from the battery 3100 into a stable voltage. The PMIC 3300 may apply the stable voltage to another component. Each of the AP 3500, the I/O interface 3510, the memory 3520, the storage 3530, the display 3540, and the communication circuit block 3550 may operate with the stable voltage applied from the PMIC 3300.

However, the embodiment in FIG. 11 is merely exemplary to help understanding a use of the power delivering device 2000 in FIG. 10. The power delivering device 2000 in FIG. 10 may be used to output a stable voltage in another type of device.

The device configuration shown in each block diagram is provided to help understanding of the inventive concept. Each block may include sub-blocks according to functions. Alternatively, a plurality of blocks may constitute a larger-unit block. That is, the inventive concept is not limited to the configuration shown in each block diagram.

According to at least one embodiment of the inventive concept, noise included in a loop, due to noise included in an input voltage, within a voltage regulator may be filtered. Thus, a PSRR characteristic of the voltage regulator with respect to a specific frequency band of the input voltage can be improved. That is, an influence of the noise caused by a specific frequency component of the input voltage may be reduced. Thus, a voltage regulator and a power delivering device may be provided to output a more stable voltage.

Moreover, a voltage regulator or a power delivering device may be implemented on a small-sized chip or board.

While the present disclosure has been particularly shown and described with reference to exemplary embodiments thereof, it will be understood by those of ordinary skill in the art that various changes in form and details may be made therein without departing from the spirit and scope of the present disclosure.

What is claimed is:

1. A voltage regulator comprising:
   a pass unit configured to transfer an input voltage provided from an input node to an output node as an output voltage according to a control signal;
   a voltage dividing unit configured to divide the output voltage to generate a divided output voltage;
   an error amplifying unit configured to output a comparison signal based on a result of comparing a magnitude of the divided output voltage with a magnitude of a reference voltage; and
   a filter unit configured to filter noise included in the outputted comparison signal to generate the control signal,
   wherein the filtered noise corresponds to noise included in the outputted comparison signal by transferring noise included in the input voltage to the error amplifying unit via the pass unit and the voltage dividing unit,
   wherein the filter unit comprises a buffer comprising an input terminal and an output terminal outputting the control signal, the input terminal connected to the output terminal.

2. The voltage regulator as set forth in claim 1, wherein the pass unit comprises an NMOS transistor, and
   wherein the control signal is provided to a gate terminal of the NMOS transistor, the input voltage is provided to one non-gate terminal of the NMOS transistor, and the output voltage is outputted from another non-gate terminal of the NMOS transistor.

3. The voltage regulator as set forth in claim 1, wherein the voltage dividing unit comprises a first dividing resistor and a second dividing resistor connected in series, and
   wherein the output voltage is provided to one of one end of the first dividing resistor and one end of the second dividing resistor, and the divided output voltage is one of a voltage across the first dividing resistor and a voltage across the second dividing resistor.

4. The voltage regulator as set forth in claim 1, wherein the error amplifying unit comprises an operational amplifier having an inverting input terminal, a non-inverting input terminal, and an output terminal, and
   wherein the divided output voltage is provided to the inverting input terminal, the reference voltage is provided to the non-inverting input terminal, and the comparison signal is outputted from the output terminal.

5. The voltage regulator as set forth in claim 1, wherein the filter unit comprises one of a low pass filter circuit and a band rejection filter circuit.

6. The voltage regulator as set forth in claim 5, wherein the filter unit is an on chip filter circuit disposed on a chip together with the pass unit, the voltage dividing unit, and the error amplifying unit.

7. The voltage regulator as set forth in claim 5, wherein the filter unit is disposed outside a chip including the pass unit, the voltage dividing unit, and the error amplifying unit.

8. The voltage regulator as set forth in claim 1, wherein the filter unit comprises a first resistor and a first capacitor each having one end connected to an output terminal of the error amplifying unit, a second resistor and a second capacitor coupled in series between another end of the first resistor and another end of the first capacitor, a third resistor having one end connected to the another end of the first resistor, a third capacitor coupled between the another end of the first capacitor and another end of the third resistor, and the buffer buffers a voltage at the another end of the third resistor to output the control signal.

9. The voltage regulator as set forth in claim 5, wherein a cut-off band of the low pass filter circuit or a rejection band of the band rejection filter circuit does not overlap a loop gain band determined by the pass unit, the voltage dividing unit, and the error amplifying unit.

10. A power delivering device comprising the voltage regulator of claim 1, the power delivering device further comprising:
  a charger configured to generate a charging current to be provided to a battery based on a charging voltage;
  a buck converter configured to output the charging voltage based on a rectified voltage;
  a high-voltage linear regulator configured to generate the input voltage, and an operation voltage for operating the buck converter based on the rectified voltage; and
  a rectifying unit configured to rectify an AC voltage provided from a transmitter to output the rectified AC voltage.

11. A power delivering device comprising:
  a DC-DC converter configured to receive an input voltage, receive a switching signal for controlling a regulated voltage to be outputted based on the received input voltage, and output the regulated voltage according to the received switching signal;
  a pass unit configured to transfer the outputted regulated voltage provided from an input node to an output node as an output voltage according to a control signal;
  a voltage dividing unit configured to divide the output voltage to generate a divided output voltage;
  an error amplifying unit configured to output a comparison signal based on a result of comparing a magnitude of the divided output voltage with a magnitude of a reference voltage; and
  a filter unit configured to filter noise included in the outputted comparison signal to generate the control signal,
  wherein the filtered noise corresponds to noise included in the outputted comparison signal by transferring noise included in the outputted regulated voltage to the error amplifying unit via the pass unit and the voltage dividing unit,
  wherein the filter unit comprises a plurality of resistors connected in parallel with a plurality of capacitors.

12. The power delivering device as set forth in claim 11, wherein the pass unit comprises a transistor, and
  wherein the control signal is provided to a gate terminal of the transistor, the input voltage is provided to one non-gate terminal of the transistor, and the output voltage is outputted from another non-gate terminal of the transistor.

13. The power delivering device as set forth in claim 11, wherein the error amplifying unit comprises an operational amplifier having an inverting input terminal, a non-inverting input terminal, and an output terminal, and
  wherein the divided output voltage is provided to the inverting input terminal, the reference voltage is provided to the non-inverting input terminal, and the comparison signal is outputted from the output terminal.

14. The power delivering device as set forth in claim 11, wherein the filter unit comprises one of a low pass filter circuit and a band rejection filter circuit.

15. The power delivering device as set forth in claim 14, wherein a cut-off band of the low pass filter circuit or a rejection band of the band rejection filter circuit does not overlap a loop gain band determined by the pass unit, the voltage dividing unit, and the error amplifying unit.

16. A voltage regulator comprising:
  a switch configured to receive an input voltage and output an output voltage according to a control signal;
  a voltage divider circuit configured to divide the output voltage to generate a divided output voltage;
  an amplifier circuit configured to output a comparison signal based on a result of comparing the divided output voltage with a reference voltage; and
  a filter circuit configured to perform a filtering operation on the comparison signal to generate the control signal,
  wherein a cut-off band or a rejection band of the filter circuit does not overlap a loop gain band determined by the switch, the voltage divider circuit, and the amplifier circuit.

17. The voltage regulator as set forth in claim 16, wherein the switch comprises a transistor, the control signal is provided to a gate terminal of the transistor, the input voltage is provided to a first non-gate terminal of the transistor, and the output voltage is outputted from a second non-gate terminal of the transistor.

18. The voltage regulator as set forth in claim 16, wherein the divided output voltage is provided from a node between a pair of resistors of the voltage divider circuit to an input of the amplifier circuit.

19. The voltage regulator as set forth in claim 16, wherein the amplifier circuit comprises an operational amplifier.

20. The voltage regulator as set forth in claim 16, wherein the filter circuit is an on-chip filter circuit disposed on an integrated circuit together with the switch, the voltage divider circuit, and the amplifier circuit, or the filter circuit is disposed outside a chip comprising the switch, the voltage divider circuit, and the amplifier circuit.

* * * * *